(12) United States Patent
King

(10) Patent No.: US 6,691,587 B1
(45) Date of Patent: Feb. 17, 2004

(54) ACTUATOR

(75) Inventor: Christopher Richard King, Stroud (GB)

(73) Assignee: ABB Offshore Systems Limited (GB)

( * ) Notice: Subject to any disclaimer, the term of this patent is extended or adjusted under 35 U.S.C. 154(b) by 2 days.

(21) Appl. No.: 09/980,465

(22) PCT Filed: Jun. 5, 2000

(86) PCT No.: PCT/GB00/02148

§ 371 (c)(1),
(2), (4) Date: Mar. 12, 2002

(87) PCT Pub. No.: WO00/75483

PCT Pub. Date: Dec. 14, 2000

(30) Foreign Application Priority Data

Jun. 5, 1999 (GB) .............................................. 9913037

(51) Int. Cl.$^7$ ............................................... F16H 27/02
(52) U.S. Cl. ...................... 74/89.35; 74/424.72; 251/59
(58) Field of Search .............................. 74/89.3, 89.35, 74/89.26, 89.29, 424.72; 251/58, 59, 60

(56) References Cited

U.S. PATENT DOCUMENTS

| 4,246,782 | A | * | 1/1981 | Hallmark | ................. | 73/152.25 |
| 4,270,385 | A | * | 6/1981 | Hallmark | ................. | 73/152.26 |
| 4,292,842 | A | * | 10/1981 | Hallmark | ................. | 73/152.26 |
| 4,637,272 | A | | 1/1987 | Teske et al. | | |
| 4,679,451 | A | | 7/1987 | Nakamura | | |
| 4,703,666 | A | | 11/1987 | Fickler | | |
| 5,115,415 | A | * | 5/1992 | Mumby et al. | ................. | 367/85 |
| 5,673,593 | A | * | 10/1997 | Lafferty | ..................... | 74/89.38 |
| 2002/0027153 | | * | 3/2002 | Sayama et al. | .......... | 228/112.1 |
| 2002/0140385 | | * | 10/2002 | Capewell | .................... | 318/280 |
| 2003/0020034 | | * | 1/2003 | Newport et al. | .............. | 251/58 |

FOREIGN PATENT DOCUMENTS

| EP | PCT/CH82/00129 | 6/1983 |
| EP | 0 685662 | 5/1995 |
| EP | 0 799 672 | 4/1996 |
| GB | 2022763 | 12/1979 |
| GB | 2092702 | 8/1982 |
| GB | 2159599 | 12/1985 |
| GB | 2190441 | 11/1987 |
| GB | 2201655 | 9/1988 |
| GB | 2311838 | 10/1997 |
| GB | 2316113 | 2/1998 |

* cited by examiner

*Primary Examiner*—David Fenstermacher
(74) *Attorney, Agent, or Firm*—Barnes & Thornburg

(57) ABSTRACT

Actuators for subsea downhole chokes have tended to include hydraulic pistons which are prone to failure and crude in accuracy. The invention provides an actuator (1) having first and second rotary motors (2, 16) and an output region (3) arranged to engage a load, such as a choke sleeve. In a first mode of operation, the first rotary motor (2) imparts linear motion to the output in a first screw connection (4, 5). In a second mode of operation, the second rotary motor (16) imparts linear motion to the output via a second screw connection (12, 14). The provision of screw connections permits gradual linear motion of the output to be achieved. The provision of two motors permits continuing performance in the event of failure of one of the motors.

22 Claims, 3 Drawing Sheets

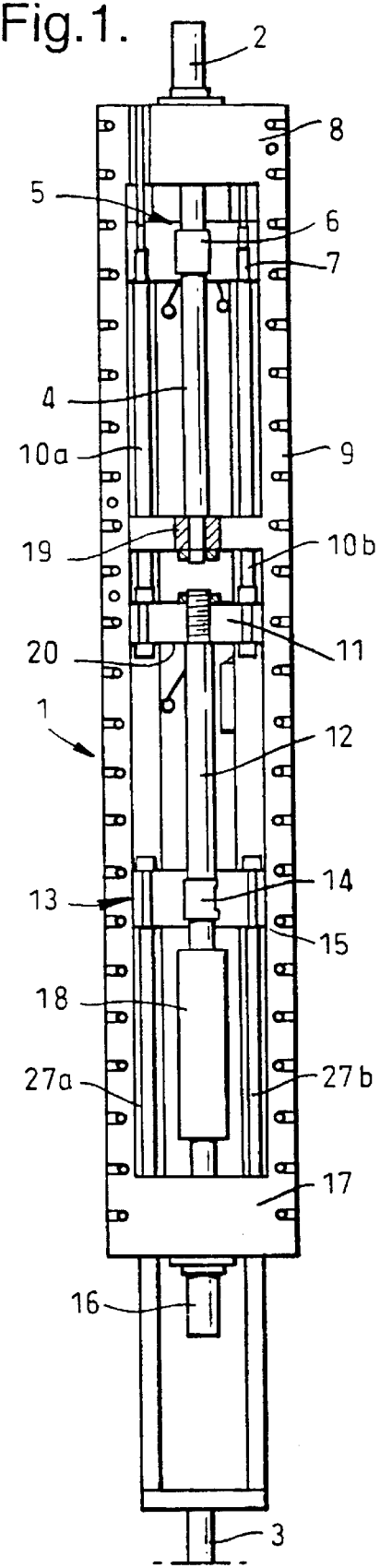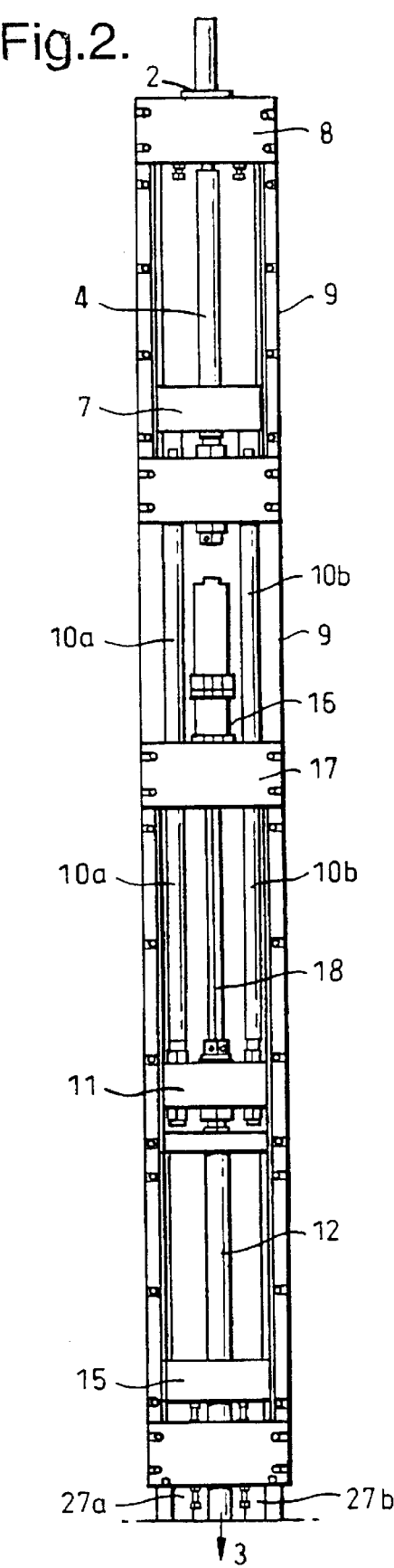

ACTUATOR

This invention relates to actuators for moving loads, for example actuators for subsea downhole chokes.

Such actuators are normally employed in subsea environments in order to provide control of chokes in downhole fluid production systems. Such chokes control the flow of fluid into or out from the well bore. Conventionally, such chokes have been simple on/off devices that merely fully opened or fully closed the flowline. Recently, there has been a requirement for variable flow control, generally in a limited number of flow control steps. The control has needed to be sufficiently accurate in order to balance pressures between different fluid sources feeding a well bore or within a multiplicity of branches of a well bore. Furthermore, the actuator mechanism has needed to be self-locking in position in the event of power failure or emergency situation.

Conventionally, a piston type of hydraulic actuator has been employed. A problem which may be associated with such actuators is that the step positions achievable by means of the hydraulic drive may be relatively crude in accuracy. Furthermore, this type of actuator does not have an inherent self-locking characteristic in the event of power failure. It has been proposed to provide an electrical backup operation which, in the event of power failure, forces the output of the actuator into a predetermined safety position. This has typically resulted in the prevention of further operation of the primary hydraulic drive after use of the electric drive. Therefore, such proposals have tended to be used as one-off emergency mechanisms, requiring expensive replacement and/or manual resetting of the actuator after recovery from the emergency.

The invention provides an actuator for moving a load, the actuator comprising an output region arranged to engage the load and first and second rotary motor means, the actuator being arranged so that, in a first mode of operation, the first rotary motor means imparts linear motion to the output region via a first screw connection; and, in a second mode of operation, the second rotary motor means imparts linear motion to the output region via a second screw connection.

The provision of screw connections permits gradual linear motion to be imparted to the output, to enable more accurate position control of the load. The provision of two rotary motor means permits the continuing performance of the actuator in the event of failure of one of the motor means.

The invention finds particular application in controlling the sleeves of subsea choke devices.

Preferably the actuator is arranged so that, in the first mode of operation, the first screw connection is urged against an intermediary-member carried by the second screw connection. In this manner, linear motion is imparted to the output region.

There may also be a third mode of operation, wherein the output means is driveable linearly by operation of both the first and second motors, via their respective screw connections. In this mode of operation, extra force is imparted to the output region, and so is suitable for emergency operation.

Preferably, the first and second screw connections are aligned axially so that maximum force is imparted to the output region.

One of the motor means may be electric, the other hydraulic. Alternatively, both motor means may be hydraulic or electric.

Either or both of the motor means may comprise two rotary motors. In this instance, one of the motors would be arranged to effect linear motion of the output region in a first direction. The other motor would be arranged to produce linear motion of the output region in a second direction.

At least one of the screw connections may comprise a nut carrying a carriage. The actuator may also include guides for the carriage. At least one of the screw connections may be arranged to carry a splined shaft.

The invention will now be described, by way of example, with reference to the accompanying drawings, in which:

FIG. 1 is a sectional view of an actuator constructed according to the invention, FIG. 2 is a sectional view of an actuator constructed according to an alternative embodiment of the invention;

Like reference numerals have been used for like parts throughout the specification.

Figure 3:
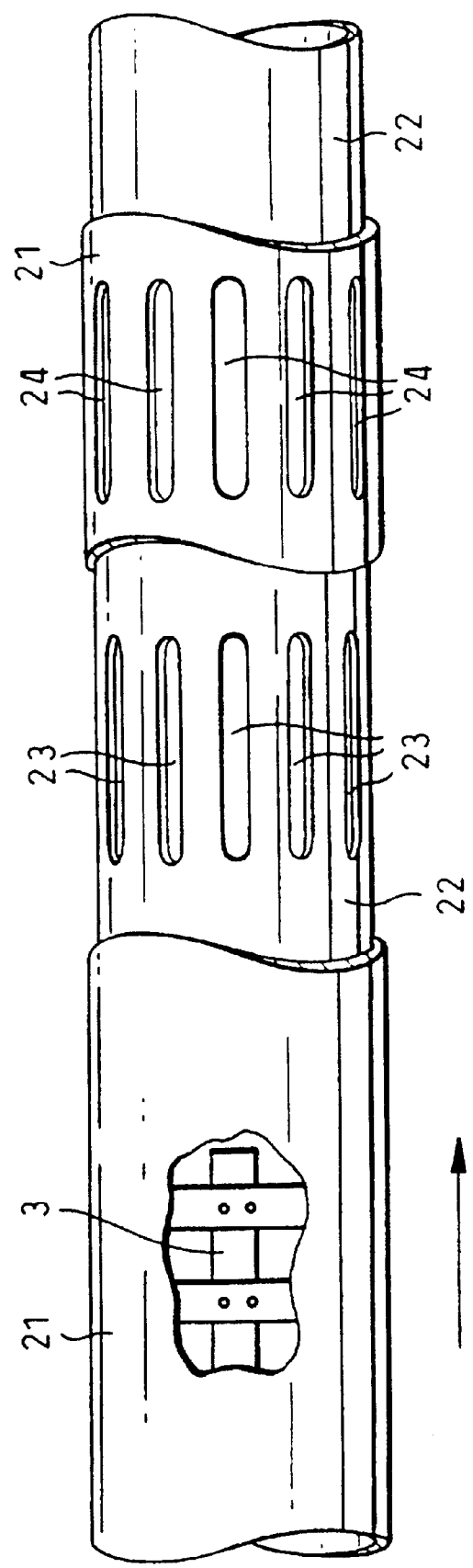
FIG. 3 is a partly cut-away, schematic diagram of a choke controllable by the apparatus of FIG. 1 or 2.

With reference to FIG. 1, the actuator, indicated generally by the reference numeral 1, comprises a first motor 2 and an output region in the form of a rod 3. The output rod 3 is connectable to, for example, a sleeve of a choke. The motor 2 is arranged to impart axial motion to the output rod 3, so that the choke sleeve is movable linearly into a desired position.

In accordance with the invention, there is provided a first screw connection comprising an externally threaded shaft 4, on which is mounted an internally threaded member 5. The internally threaded member 5 is in the form of a low-friction nut 6 which carries a carriage 7. The shaft 4 is supported by a bearing 19 at one end portion and a bearing (not shown) at the other end portion, located within the gearbox 8 of the motor 2. The bearings locate the shaft 4 in position whilst permitting rotational motion of the shaft. The motor 2 provides a rotational drive to the threaded shaft 4 by means of the gearbox 8. This results in linear movement of the low-friction nut 6, and hence the carriage 7. The motion of the carriage 7 may be in either axial direction, in dependence on the direction of rotation of the threaded shaft 4 as produced by the motor 2. The body 9 of the actuator 1 functions as a guide for the carriage 7. The carriage 7 is attached to internal push rods 10a, 10b, the other end portions of which engage a second, intermediate carriage 11.

This intermediate carriage 11 is carried by a second shaft 12, at least a portion of which is externally threaded. A second internally threaded member 13 is carried by the externally threaded portion of shaft 12. The second internally threaded member 13 comprises a low-friction nut 14 carrying a third carriage 15. The third carriage 15 is arranged to engage with the output rod 3 via a second set of push rods 27a, 27b.

Therefore, rotation of the first threaded shaft 4 by the motor 2 effects linear axial motion of the first carriage 7, which, in turn, urges against the intermediate carriage 11 by means of the rods 10a, 10b. Thus, linear motion is imparted to the arrangement of the intermediate carriage 11, second threaded shaft 12 and third carriage 15. The third carriage 15 bears against the push rods 27a, 27b and hence linear motion of the output rod 3 is effected.

There is also provided a second motor 16. This second motor 16 is arranged to provide a rotational drive to a second screw connection, comprising the threaded shaft 12 and nut 14, by means of gearbox 17 acting via a splined shaft 18. The second threaded shaft 12 is supported, at one end portion, by a bearing 20 located in the intermediate carriage 11. The other end portion of the shaft is supported by a bearing (not shown) within the gearbox 17. Rotational movement of the second threaded shaft 12 causes axial linear motion of the low-friction nut 14, and hence the third carriage 15. The third carriage 15 moves laterally within the body, in dependence on the direction of rotation of the second motor 16. The body 9 of the actuator 1 again acts as a guide for this carriage 15. The motion of the third carriage 15 is transmitted to the output 3 via the rods 27a, 27b. Thus, rotation effected by the second motor 16 causes the output rod 3 to push or pull axially, depending on the direction of rotation imparted by the second motor.

The purpose of the splined shaft 18 is to accommodate differential movement of the carriages, whilst ensuring positive transmission of the second motor 16 to the second threaded shaft 12. The splined shaft may be associated with the second motor, or the first motor, or both motors.

Either the first motor 2, or the second motor 16 can be the primary operating drive, with the other motor as backup. Additionally, both motors can be arranged to operate cooperatively in order to provide additional force to the output 3.

A high degree of accuracy of the positioning of the actuator output rod 3 is easily achieved from the gearing in the gearboxes 8, 17 and the indirect efficiency of the threaded shafts 4, 12 of the screw connections.

The actuator 1 also is self-locking. If either or both motors are at rest, backward driving of the motors by application of a force on the actuator rod itself, is not possible owing to a number of factors, namely 1) the high value of the indirect transmission efficiency of the screw connections when being back-driven, 2) additional friction through the gearboxes 8, 17 when being back-driven and 3) (if the motor is hydraulic) isolation of hydraulic fluid at the motor.

An alternative arrangement of the invention is shown in FIG. 2. In this embodiment, the second rotary motor means 16 is mounted in a more central location in the actuator mechanism. The splined shaft 18 also occupies a more central position. The working of this alternative actuator is the same as that of FIG. 1. Activation of the first rotary motor 2 imparts linear motion to the carriage 7 carried by the first screw connection (shaft 4 and nut 6). The carriage 7 bears on push rods 10a, 10b which, in turn, bear against the intermediate carriage 11. Linear motion imparted to the intermediate carriage 11 is translated into motion of the threaded shaft 12 and third carriage 15 and, hence, the push rods 27a, 27b connected to the output region (not shown in this drawing).

Activation of the second motor 16 imparts linear motion to the third carriage 15 carried by the second screw connection (shaft 12 and nut 14). This imparts motion to the push rods 27a, 27b and hence the output region. It is thought that the arrangement of FIG. 2 may permit the manufacture of shorter actuators than that of FIG. 1, but giving the same extent of linear motion.

The invention finds particular application in the control of chokes in downhole subsea environments. Referring now to FIG. 3, there is illustrated such a choke comprising an inner sleeve 22 capable of sliding motion within an outer sleeve 21. In the choke position of FIG. 3, the outer sleeve 21 extends over slots 23 in the inner sleeve 22. Thus, in this position, the choke is fully closed.

The output means 3 of the actuator 1 is also shown in FIG. 3. The output means 3 is attached to the inner sleeve 22.

Linear motion of the output means 3 in the direction shown by the arrow causes the sleeve 22 to move slidably in that same direction. The sleeve 21 has slots 24 around its circumference, the slots extending axially along the sleeve. The slots 24 on the sleeve 21 begin to overlap with the slots 23 in the inner sleeve 22, with the result that the choke becomes partially opened. Further motion in the direction of the arrow eventually results in full overlap of the slots 24 and 23, so that the choke becomes fully opened. The actuator may also be controlled so that the output means moves in the opposite direction, in which case the degree of overlap between the slots 23 and 24 will lessen, and the choke will begin to close again.

Figure 4:
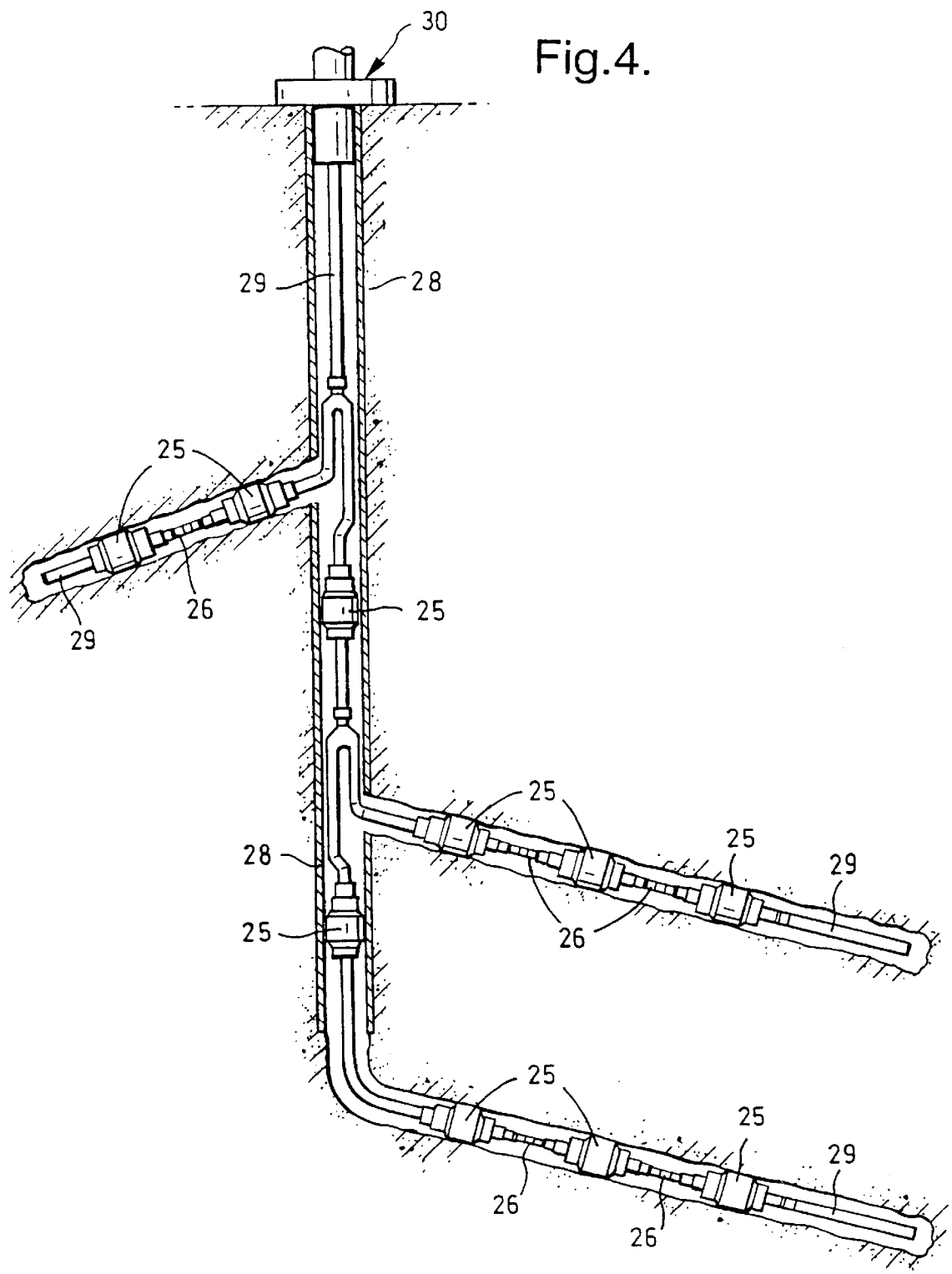
FIG. 4 is a schematic diagram showing an arrangement of actuators according to FIG. 1 or 2, employed in a subsea well bore.

FIG. 4 shows a typical arrangement of a well bore with a number of branches. The borehole is lined with a casing comprising a steel pipe 28, cemented into position within the main bore. Production tubing 29 extends from the mouth 30 of the bore to oil reservoirs. The space, or annulus, between the casing 28 and the tubing 29 is sealed at points along the length of the tubing by means of devices known as packers 25. Interposed between adjacent packers 25 are chokes 26 which are each operated by actuators, such as that illustrated in FIG. 1 or 2. In use, oil enters the production tubing 29 either through the open lower ends at the ends of the branches, or through the slots in the choke devices 26, if open. The selection and operation of the motors associated with the choke actuators is carried out by operator selection by means of a surface control display. Sensors (not shown) may be employed to provide the operator with accurate information regarding the position and condition of the chokes 26.

The invention permits fine control of the chokes, 26, or other loads, to achieve balancing of the pressures and/or flows in the system. Furthermore, the invention is reliable owing to the independent power source backups. Additionally, the invention provides additional operating forces if required in an emergency, Preferably, one of the motors is hydraulic, the other electric, although both motors may be hydraulically or electrically driven. Of course, other types of motors may be employed.

Further variations may be made without departing from the scope of the invention. For example, some bidirectional motors produce different output powers, in dependence on the direction of rotation. Thus, there may be a discrepancy in the force produced at the output between the push and pull directions. To overcome this, the single bidirectional motor 2 or 16, may be replaced by two back to back unidirectional motors. Furthermore, the bidirectional motor 2 (or 16), illustrated in FIGS. 1 and 2, may be replaced by two bidirectional motors, mounted at different angles with respect to each other. This arrangement reduces the effect of ripple of the motor torques, which is a typical characteristic of the positive displacement type of motors. Such motors also typically have a sinusoidal variation of output torque with rotational angle, so that, at some angular positions of the motor shaft, there will be a reduced torque output. Mounting the motors back to back so that the sinusoidal ripples of output torque are 180° out of phase with each other results in a major reduction of torque minimums and thus optimises the output torque of the motor pair, particularly at startup. This gives the actuator the best opportunity to overcome friction, at startup, of the device it is actuating for example a downhole choke sleeve.

Both the bidirectional or unidirectional motors can be supplied from separate power sources to further increase the reliability of the system employing the actuator.

Both of the motors may be hydraulic, or alternatively both electric, so that a backup drive facility is provided from two independent hydraulic or electric power sources.

More than one output rod 3 may be provided.

An internally threaded carriage may be substituted for either, or both, of the carriage and nut arrangements 6, 7 and 14, 15. Alternatively, either, or both, of the carriages may be arranged to run on rollers engaged by the external thread of the respective shaft. The internally threaded members 5, 13 may in fact be replaced by any arrangement for producing linear motion by cooperation with a rotating, externally threaded shaft.

The invention may also be applied to any other downhole tools and production devices regarding a push/pull operation, in a well bore environment. The invention may also find application in the control of aircraft.

What is claimed is:

1. An actuator for moving a load, the actuator comprising an output region arranged to engage the load and first and second rotary motor means, the actuator being arranged so that, in a first mode of operation, the first rotary motor means imparts linear motion to the output region via a first screw connection; and, in a second mode of operation, the second rotary motor means imparts linear motion to the output region via a second screw connection, the first and second rotary motor means producing rotation about an axis parallel to the direction of linear motion, the first and second rotary motor means being independently operable to effect movement of the output region.

2. An actuator as claimed in claim 1, arranged so that, in the first mode of operation, the first screw connection bears upon an intermediary member in connection with the second screw connection, thereby to impart linear motion to the output region.

3. An actuator as claimed in claim 1, arranged so that, in a third mode of operation, both first and second rotary motors are arranged to impart linear motion to the output region via their respective screw connections.

4. An actuator as claimed in claim 1, wherein the first and second screw connections are aligned axially.

5. An actuator as claimed in claim 1, wherein one of the first and second motor means is hydraulic, the other of the first and second motor means being electric.

6. An actuator as claimed in claim 1, wherein the first and second motor means are both hydraulic.

7. An actuator as claimed in claim 1 wherein the first and second motor means are both electric.

8. An actuator as claimed in claim 1, in which the first motor means comprises two rotary motors, one of which is arranged to impart linear motion of the output region in a first direction, the other of which is arranged to impart linear motion to the output region in a second direction.

9. An actuator as claimed in claim 8, in which the motors of the respective motor means are aligned axially.

10. An actuator as claimed in claim 8, in which at least one of the motors of the respective motor means is offset from the axis of linear motion.

11. An actuator as claimed in claim 1, in which at least one of the first and second motor means comprises two rotary motors, one of which is arranged to impart linear motion of the output region in a first direction, the other of which is arranged to impart linear motion of the output region in a second direction.

12. An actuator as claimed in claim 1, in which at least one of the screw connections includes a carriage.

13. An actuator as claimed in claim 12, further comprising guides for the carriage.

14. An actuator as claimed in claim 1, in which at least one of the screw connection includes a nut carrying a carriage.

15. An actuator as claimed in claim 1, in which at least one of the screw connections includes a splined shaft.

16. An actuator as claimed in claim 1, which the output region is arranged, in use, to resist motion of the load by an external force.

17. An actuator for controlling a choke, the actuator comprising an output region arranged to engage a sleeve of the choke and first and second rotary motor means, the actuator being arranged so that, in a first mode of operation, the first rotary motor means imparts linear motion to the output region via a first screw connection; and, in a second mode of operation, the second rotary motor means imparts linear motion to the output region via a second screw connection, the first and second rotary motor means producing rotation about an axis parallel to the direction of linear motion, the first and second rotary motor means being independently operable to effect movement of the output region.

18. An actuator as claimed in claim 17, arranged so that, in the first mode of operation, the first screw connection bears upon an intermediary member in connection with the second screw connection, thereby to impart linear motion to the output region.

19. An actuator as claimed in claim 17, in which the first motor means comprises two rotary motors, one of which is arranged to impart linear motion of the output region in a first direction, the other of which is arranged to impart linear motion to the output region in a second direction.

20. An actuator as claimed in claim 17, in which at least one of the first and second motor means comprises two rotary motors, one of which is arranged to impart linear motion of the output region in a first direction, the other of which is arranged to impart linear motion of the output region in a second direction.

21. A method of operating an actuator to move a load comprising imparting linear motion to an output region of the actuator by rotation of a first screw connection or a second screw connection effected by respective first and second rotary motor means, said first and second rotary motor means producing rotary motion about an axis parallel to the direction of linear motion, and said first and second rotary motor means being independently operable to impart motion to the output region, the output region being arranged to engage with the load.

22. A method of operating an actuator to control a choke comprising imparting linear motion to an output region of the actuator by rotation of a first screw connection or a second screw connection, effected by respective first and second rotary motor means, said first and second rotary motor means producing rotary motion about an axis parallel to the direction of linear motion, and said first and second rotary motor means being independently operable to impart motion to the output region, the output region being arranged to engage with a sleeve of the choke.

* * * * *